(12) United States Patent
Sung et al.

(10) Patent No.: US 11,769,929 B2
(45) Date of Patent: Sep. 26, 2023

(54) SEPARATOR FOR ELECTROCHEMICAL DEVICE AND ELECTROCHEMICAL DEVICE CONTAINING SAME

(71) Applicant: LG CHEM, LTD., Seoul (KR)

(72) Inventors: Dong-Wook Sung, Daejeon (KR); Hyun-Kyung Shin, Daejeon (KR); Jong-Yoon Lee, Daejeon (KR); Dae-Sung Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 181 days.

(21) Appl. No.: 16/960,438

(22) PCT Filed: Nov. 4, 2019

(86) PCT No.: PCT/KR2019/014844
§ 371 (c)(1),
(2) Date: Jul. 7, 2020

(87) PCT Pub. No.: WO2020/096310
PCT Pub. Date: May 14, 2020

(65) Prior Publication Data
US 2020/0350546 A1    Nov. 5, 2020

(30) Foreign Application Priority Data

Nov. 5, 2018 (KR) .................. 10-2018-0134654

(51) Int. Cl.
*H01M 50/449* (2021.01)
*H01G 11/52* (2013.01)
(Continued)

(52) U.S. Cl.
CPC ............ *H01G 11/52* (2013.01); *H01G 11/22* (2013.01); *H01M 10/052* (2013.01);
(Continued)

(58) Field of Classification Search
CPC ............ H01M 50/443; H01M 50/446; H01M 50/449; H01M 50/411; H01M 50/417;
(Continued)

(56) References Cited

U.S. PATENT DOCUMENTS

| 10,608,226 B2 * | 3/2020 | Xie ...................... H01M 50/489 |
| 2002/0102455 A1 * | 8/2002 | Daroux ................... B32B 27/08 |
| | | 29/623.3 |

(Continued)

FOREIGN PATENT DOCUMENTS

| CN | 104051696 A | 9/2014 |
| CN | 104205415 A | 12/2014 |

(Continued)

OTHER PUBLICATIONS

International Search Report for PCT/KR2019/014844 dated Feb. 21, 2020.

(Continued)

*Primary Examiner* — Jeremiah R Smith
(74) *Attorney, Agent, or Firm* — Birch, Stewart, Kolasch & Birch, LLP

(57) ABSTRACT

A separator that includes a porous polymer substrate, a first porous coating layer and a second porous coating layer. First inorganic particles contained in the first porous coating layer have a lower hardness as compared to the second inorganic particles contained in the second porous coating layer. Since the separator is provided with at least two porous coating layers including inorganic particles having a different hardnesses, it is possible to increase the dielectric breakdown voltage, and thus to provide a battery with improved safety. It is also possible to reduce deformation of the separator caused by heat or pressure.

12 Claims, 1 Drawing Sheet

(51) Int. Cl.
*H01G 11/22* (2013.01)
*H01M 10/052* (2010.01)
*H01M 50/446* (2021.01)
*H01M 50/417* (2021.01)
*H01M 50/42* (2021.01)
*H01M 50/443* (2021.01)
*H01M 50/489* (2021.01)
*H01M 50/451* (2021.01)
*H01M 50/457* (2021.01)

(52) U.S. Cl.
CPC ......... *H01M 50/417* (2021.01); *H01M 50/42* (2021.01); *H01M 50/443* (2021.01); *H01M 50/446* (2021.01); *H01M 50/451* (2021.01); *H01M 50/457* (2021.01); *H01M 50/489* (2021.01)

(58) Field of Classification Search
CPC ............. H01M 50/431; H01M 50/434; H01M 10/0525
See application file for complete search history.

(56) References Cited

U.S. PATENT DOCUMENTS

| | | | | |
|---|---|---|---|---|
| 2013/0244082 A1* | 9/2013 | Lee | ....................... | H01M 4/485 |
| | | | | 429/144 |
| 2014/0287294 A1* | 9/2014 | Lee | ....................... | H01M 50/42 |
| | | | | 427/562 |
| 2014/0322586 A1 | 10/2014 | Lee et al. | | |
| 2015/0333308 A1* | 11/2015 | Toyoda | ............... | H01M 50/403 |
| | | | | 429/144 |
| 2017/0237056 A1 | 8/2017 | Watanabe et al. | | |
| 2018/0315969 A1 | 11/2018 | Sung et al. | | |
| 2019/0131604 A1 | 5/2019 | Yoon et al. | | |
| 2020/0083506 A1* | 3/2020 | Herle | .................. | H01M 50/489 |
| 2021/0234235 A1* | 7/2021 | Kang | .................. | H01M 50/443 |

FOREIGN PATENT DOCUMENTS

| | | |
|---|---|---|
| CN | 205406613 U | 7/2016 |
| JP | 2011-110704 A | 6/2011 |
| JP | 2013-218898 A | 10/2013 |
| JP | 2015-524991 A | 8/2015 |
| KR | 10-2014-0070484 A | 6/2014 |
| KR | 10-2014-0073957 A | 6/2014 |
| KR | 10-2016-0109669 A | 9/2016 |
| KR | 10-1756070 B1 | 7/2017 |
| KR | 10-2017-0138958 A | 12/2017 |
| KR | 10-2018-0018408 A | 2/2018 |
| WO | WO 2017/187780 A1 | 11/2017 |

OTHER PUBLICATIONS

Indian Office Action dated Jan. 16, 2023 for Indian Application No. 202017051268 with English translation.

* cited by examiner

SEPARATOR FOR ELECTROCHEMICAL DEVICE AND ELECTROCHEMICAL DEVICE CONTAINING SAME

TECHNICAL FIELD

The present disclosure relates to a separator applicable to an electrochemical device, such as a lithium secondary battery, and an electrochemical device including the same.

The present application claims priority to Korean Patent Application No. 10-2018-0134654 filed on Nov. 5, 2018 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles with a binder polymer onto at least one surface of a porous substrate having a plurality of pores.

Such a separator has been developed in such a manner that it may have a small thickness and may be formed into a thin film in order to increase the energy density of a battery. However, as the thickness of the separator is decreased, the dielectric breakdown voltage of a battery is reduced to cause degradation of battery safety and an increase in defect generation in the Hi-pot test.

Meanwhile, when assembling a battery having a separator interposed between electrodes, heat and pressure are applied during a lamination step, or the like, and thus the dielectric breakdown voltage is reduced to cause problems, such as deformation of the separator.

DISCLOSURE

Technical Problem

The present disclosure is directed to providing a separator for an electrochemical device which provides a battery with a high dielectric breakdown voltage and high safety, is less susceptible to deformation when heat or pressure is applied thereto and shows increased mechanical strength.

The present disclosure is also directed to providing an electrochemical device including the separator.

Technical Solution

According to the first embodiment of the present disclosure, three is provided a separator for an electrochemical device which includes:

a porous polymer substrate having a plurality of pores;

a first porous coating layer formed on at least one surface of the porous polymer substrate, the first porous coating layer comprising first inorganic particles and a first binder polymer positioned on the whole or a part of the surface of the first inorganic particles to connect and fix the first inorganic particles with one another; and a second porous coating layer formed on at least one surface of the first porous coating layer opposite the porous polymer substrate, a the second porous coating layer comprising second inorganic particles and a second binder polymer positioned on the whole or a part of the surface of the second inorganic particles to connect and fix the second inorganic particles with one another, wherein the first inorganic particles have a Mohs hardness of 4.5 or less and the second inorganic particles have a Mohs hardness of 7 or more.

According to the second embodiment of the present disclosure, there is provided the separator for an electrochemical device as defined in the first embodiment, wherein the difference in Mohs hardness between the first inorganic particles and the second inorganic particles is 2.5 or more.

According to the third embodiment of the present disclosure, there is provided the separator for an electrochemical device as defined in the first or the second embodiment, wherein the first inorganic particles include at least one of boehmite, zinc oxide, magnesium oxide, magnesium hydroxide, or aluminum hydroxide.

According to the fourth embodiment of the present disclosure, there is provided the separator for an electrochemical device as defined in any one the first to the third embodiments, wherein the second inorganic particles include at least one of alumina, or aluminum nitride.

According to the fifth embodiment of the present disclosure, there is provided the separator for an electrochemical device as defined in any one of the first to the fourth embodiments, wherein the first inorganic particles have an average particle diameter of 50 nm to 3000 nm.

According to the sixth embodiment of the present disclosure, there is provided the separator for an electrochemical device as defined in any one of the first to the fifth embodiments, wherein the second inorganic particles have an average diameter of 50_nm to 3000 nm.

According to the seventh embodiment of the present disclosure, there is provided the separator for an electrochemical device as defined in any one of the first to the sixth embodiments, wherein the weight ratio of the first inorganic particles:the first binder polymer is 20:80 to 95:5.

According to the eighth embodiment of the present disclosure, there is provided the separator for an electrochemical device as defined in any one of the first to the seventh embodiments, wherein the weight ratio of the second inorganic particles:the second binder polymer is 20:80 to 95:5.

According to the ninth embodiment of the present disclosure, there is provided the separator for an electrochemical device as defined in any one of the first to the eighth embodiments, wherein the first porous coating layer has a thickness of 1 μm to 20 μm, and the second porous coating layer has a thickness of 1 μm to 20 μm.

According to the tenth embodiment of the present disclosure, there is provided the separator for an electrochemical device as defined in any one of the first to the ninth embodiments, wherein each of the first binder polymer and the second binder polymer independently includes at least one of polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylhexyl acrylate-co-methyl methacrylate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, or carboxymethyl cellulose.

According to the eleventh embodiment of the present disclosure, there is provided the separator for an electrochemical device as defined in any one of the first to the tenth embodiments, wherein the second porous coating layer is the outermost layer of the separator.

According to the twelfth embodiment of the present disclosure, there is provided the separator for an electrochemical device as defined in any one of the first to the eleventh embodiments, which further includes an adhesive layer containing adhesive resin particles, on the second porous coating layer.

According to the thirteenth embodiment of the present disclosure, there is provided the separator for an electrochemical device as defined in any one of the first to the twelfth embodiments, wherein the adhesive resin particles include at least one selected from styrene butadiene rubber, acrylonitrile-butadiene rubber, acrylonitrile-butadiene-styrene rubber, polyethylhexyl acrylate-co-methyl methacarylate, polybutylacrylate-co-methyl methacrylate, polyacrylonitrile, polyvinyl chloride, polyvinylidene fluoride, polyvinyl alcohol, styrene or polycyanoacrylate.

In another aspect of the present disclosure, there is also provided an electrochemical device according to any one of the following embodiments.

According to the fourteenth embodiment of the present disclosure, there is provided an electrochemical device including a cathode, an anode and a separator interposed between the cathode and the anode, wherein the separator is the separator as defined in any one of the first to the thirteenth embodiments.

According to the fifteenth embodiment, there is provided the electrochemical device as defined in the fourteenth embodiment, wherein the electrochemical device is a lithium secondary battery.

Advantageous Effects

The separator for an electrochemical device according to the present disclosure is provided with at least two porous coating layers containing inorganic particles having a different hardness. Herein, the outermost layer includes inorganic particles having a higher hardness, and thus shows high resistance against external foreign materials, such as metal. As a result, the dielectric breakdown voltage is increased to provide a battery with improved safety.

Meanwhile, the porous coating layer directly facing the porous polymer substrate uses inorganic particles having a lower hardness, and thus it is possible to reduce the deformation of the separator caused by heat and/or pressure.

BEST MODE

Figure 1:
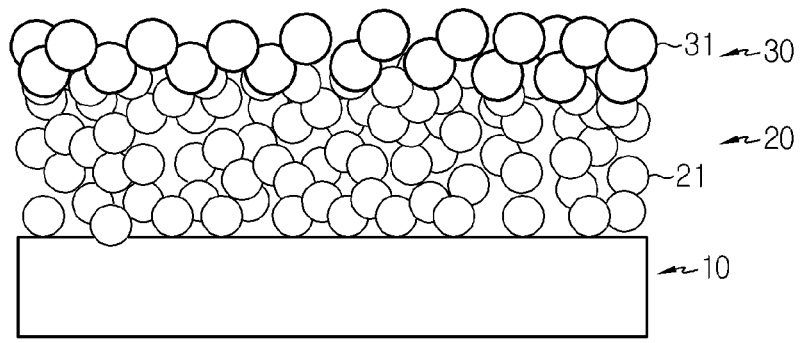
FIG. 1 is a schematic view illustrating the separator according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part[includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

A separator used for an electrochemical device, such as a lithium secondary battery, is interposed between an anode and a cathode and functions to separate the anode and the cathode physically from each other and to insulate them electrically from each other.

Such a separator generally uses a polyolefin-based porous polymer substrate and shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles with a binder polymer onto at least one surface of a porous substrate having a plurality of pores.

Such a separator has been developed in such a manner that it may have a small thickness and may be formed into a thin film in order to increase the energy density of a battery. However, as the thickness of the separator is decreased, the dielectric breakdown voltage of a battery is reduced to cause degradation of battery safety and an increase in defect generation in the Hi-pot test.

Meanwhile, when assembling a battery having a separator interposed between electrodes, heat and pressure are applied during a lamination step, or the like, and thus the dielectric breakdown voltage is reduced to cause problems, such as deformation of the separator.

In one aspect of the present disclosure, there is provided a separator for an electrochemical device to solve the above-mentioned problems.

The separator includes:

a porous polymer substrate having a plurality of pores;

a first porous coating layer formed on at least one surface of the porous polymer substrate, and containing a first inorganic particles and a first binder polymer positioned on the whole or a part of the surface of the first inorganic particles to connect the inorganic particles with one another and fix them; and a second porous coating layer formed on at least one surface of the first porous coating layer, and containing a second inorganic particles and a second binder polymer positioned on the whole or a part of the surface of the second inorganic particles to connect the inorganic particles with one another and fix them, wherein the first inorganic particles have a Mohs hardness of 4.5 or less and the second inorganic particles have a Mohs hardness of 7 or more.

FIG. 1 is a schematic view illustrating the separator according to an embodiment of the present disclosure.

As shown in FIG. 1, the separator 100 according to the present disclosure includes: a porous polymer substrate 10; a first porous coating layer 20 formed on at least one surface of the porous polymer substrate 10, and containing a first inorganic particles 21 and a first binder polymer (not shown) positioned on the whole or a part of the surface of the first inorganic particles 21 to connect the inorganic particles with one another and fix them; and a second porous coating layer 30 formed on at least one surface of the first porous coating layer 20, and containing a second inorganic particles 31 and a second binder polymer (not shown) positioned on the whole or a part of the surface of the second inorganic particles 31 to connect the inorganic particles with one another and fix them, wherein the first inorganic particles have a Mohs hardness of 4.5 or less and the second inorganic particles have a Mohs hardness of 7 or more.

The separator for an electrochemical device according to an embodiment of the present disclosure includes the first porous coating layer and the second porous coating layer, wherein the first inorganic particles contained in the first porous coating layer have a Mohs hardness of 4.5 or less and the second inorganic particles contained in the second porous coating layer have a Mohs hardness of 7 or more.

Figure 2:
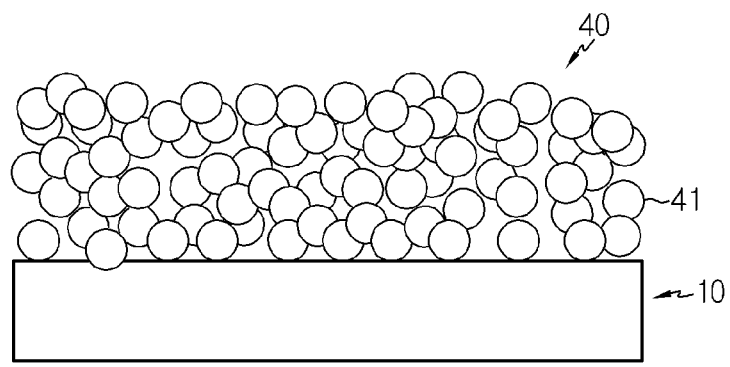
FIG. 2 is a schematic view illustrating the separator according to Comparative Example.

As shown in FIG. 2, in the case of a separator 200 including a single porous coating layer 40 using inorganic particles 41 having the same hardness alone, there is a problem in that the separator may be deformed or broken due to the heat or pressure applied during the manufacture of an electrode assembly. In addition, as the separator is formed into a thin film, it causes degradation of dielectric breakdown characteristics of a battery and increased defect generation in the Hi-pot test.

To solve the above-mentioned problems, the separator according to an embodiment of the present disclosure uses inorganic particles having a low Mohs hardness in the first porous coating layer directly facing the porous polymer substrate, and uses inorganic particles having a high Mohs hardness in the second porous coating layer.

As used herein, the term 'Mohs hardness' refers to a value of hardness evaluated by comparing the hardness of a material to those of 10 types of minerals as standard materials (Mohs hardness 1: talc, Mohs hardness 2: gypsum, Mohs hardness 3: calcite, Mohs hardness 4: fluorite, Mohs hardness 5: apatite, Mohs hardness 6: orthoclase, Mohs hardness 7: quartz, Mohs hardness 8: topaz, Mohs hardness 9: corundum, and Mohs hardness 10: diamond). When a material is rubbed against a standard material and the material generates scratches, the material is judges to have a lower hardness. In addition, when it is difficult to determine the Mohs hardness of a material directly, the material is analyzed for its composition and its hardness may be determined from another material having the same composition.

Meanwhile, in the separator according to an embodiment of the present disclosure, the first inorganic particles contained in the first porous coating layer have a Mohs hardness of 4.5 or less.

When the first inorganic particles have a Mohs hardness higher than 4.5, the inorganic particles having such a high Mohs hardness and contained in the porous coating layer impair the porous polymer substrate to cause degradation of insulation quality.

Since the first porous coating layer includes the first inorganic particles having a low Mohs hardness, it is possible to prevent deformation of the separator caused by heat or pressure.

According to an embodiment of the present disclosure, the first inorganic particles may include boehmite (AlO(OH)) (Mohs hardness: 3.5-4), zinc oxide (ZnO) (Mohs hardness: 4.5), magnesium oxide (MgO) (Mohs hardness: 4), magnesium hydroxide ($Mg(OH)_2$) (Mohs hardness: 2.5), aluminum hydroxide ($Al(OH)_3$) (Mohs hardness: 2.5-3.5), or a mixture thereof.

According to an embodiment of the present disclosure, the first inorganic particles, particularly aluminum hydroxide, has a low Mohs hardness preferably so that they may minimize damages upon the porous polymer substrate, thereby minimizing degradation of battery performance and improving processability during the assemblage of a battery. In addition, it is possible to minimize a decrease in porosity caused by the first inorganic particles and to minimize a decrease in dielectric breakdown voltage. In addition, aluminum hydroxide and boehmite are preferred in terms of dispersibility, as compared to magnesium oxide.

According to an embodiment of the present disclosure, the first inorganic particles may have an average particle diameter of 50-3000 nm, 100-2000 nm, or 200-1000 nm. When the first inorganic particles satisfy the above-defined range of average particle diameter, it is possible to realize heat resistance and dispersibility at the same time, preferably.

Meanwhile, in the separator according to an embodiment of the present disclosure, the second inorganic particles contained in the second porous coating layer have a Mohs hardness of 7 or more.

When the second inorganic particles have a hardness less than 7, there is a problem in that they are vulnerable to external foreign material during assemblage. For example, in the case of iron (Mohs hardness: 5), it has low resistance against external foreign materials, and thus may cause damages upon the separator.

On the contrary, when the second inorganic particles have a Mohs hardness of 7 or more, it is possible to provide high resistance against external foreign materials, such as metal.

According to an embodiment of the present disclosure, the second inorganic particles may include alumina ($Al_2O_3$) (Mohs hardness: 9), aluminum nitride (AlN) (Mohs hardness: 7) or a mixture thereof.

According to an embodiment of the present disclosure, the second inorganic particles, particularly alumina, it has significantly high hardness and thus is preferred in terms of battery performance and processability during assemblage. For example, it is possible to reduce damages upon the separator caused by the friction with an instrument/device during assemblage. Particularly, when applying lamination of an electrode with the separator, it is possible to minimize damages upon the separator caused by foreign materials.

According to an embodiment of the present disclosure, the difference in Mohs hardness between the first inorganic particles and the second inorganic particles may be 2.5 or more, 3 or more, or 5 or more. Particularly, as the difference in Mohs hardness is increased, resistance against external foreign materials is increased and damages upon the porous polymer substrate is reduced, which is favorable in terms of processability during the assemblage of a battery.

According to an embodiment of the present disclosure, the second inorganic particles may have an average particle diameter of 50-3000 nm, 100-2000 nm, or 200-1000 nm. When the second inorganic particles satisfy the above-defined range of average particle diameter, it is possible to realize heat resistance and dispersibility at the same time, preferably.

As used herein, the term 'average particle diameter' refers to average diameter (D50) of inorganic particles and may be defined as diameter at 50% in the diameter distribution. According to an embodiment of the present disclosure, the particle diameter may be determined by using a laser diffraction method. The laser diffraction method generally allows determination of particle diameter ranging from the submicron region to several nanometers and provides results with high reproducibility and high resolution.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

According to an embodiment of the present disclosure, each of the first binder polymer and the second binder polymer may independently include a polyvinylidene fluoride-based binder polymer or acrylic binder polymer.

According to an embodiment of the present disclosure, the polyvinylidene fluoride-based binder polymer may include polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-trifluorochloroethylene, polyvinylidene fluoride-co-ethylene, or a mixture thereof.

According to an embodiment of the present disclosure, the acrylic binder polymer may include polyethylhexyl acrylate-co-methyl methacrylate, polymethyl methacrylate, polyethylhexyl acrylate, polybutyl acrylate, polyacrylonitrile, polybutyl acrylate-co-methyl methacrylate, or a mixture of thereof.

As a non-limiting example of binder polymer, each of the first binder polymer and the second binder polymer may independently include polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, or a mixture thereof.

The weight ratio of the inorganic particles to the binder polymer may be 20:80-95:5, particularly 70:30-95:5. When the weight ratio of the inorganic particles to the binder polymer satisfies the above-defined range, it is possible to prevent the problem of a decrease in pore size and porosity of the resultant coating layer, caused by an increase in content of the binder polymer. It is also possible to solve the problem of degradation of peeling resistance of the resultant coating layer, caused by a decrease in content of the binder polymer.

The electrode assembly according to an embodiment of the present disclosure may further include other additives as ingredients of the porous coating layer, besides the inorganic particles and binder polymer.

According to an embodiment of the present disclosure, the first porous coating layer may have a thickness of 1-20 μm, and the second porous coating layer may have a thickness of 1-20 μm. For example, in the case of the first porous coating layer, it is desirable that the coating layer thickness is larger than the diameter of the first inorganic particles. In the case of the second porous coating layer, a larger coating layer thickness is preferred for higher resistance against external foreign materials. However, when the second porous coating layer has a thickness larger than 20 μm, resistance is increased and volume is also increased undesirably.

According to an embodiment of the present disclosure, the porous coating layer may be formed on one surface or both surfaces of the porous polymer substrate.

According to an embodiment of the present disclosure, the separator may further include an adhesive layer containing adhesive resin particles, on the second porous coating layer.

According to an embodiment of the present disclosure, the adhesive resin particles may include any one selected from styrene butadiene rubber (SBR), acrylonitrile-butadiene rubber, acrylonitrile-butadiene-styrene rubber, polyethylhexyl acrylate-co-methyl methacarylate, polybutylacrylate-co-methyl methacrylate, polyacrylonitrile, polyvinyl chloride, polyvinylidene fluoride, polyvinyl alcohol, styrene and polycyanoacrylate, or a mixture thereof.

The adhesive layer is formed to increase the adhesion between the separator and an electrode, and is preferred particularly when the second porous coating layer is aqueous slurry using water as a solvent.

Meanwhile, according to an embodiment of the present disclosure, the second porous coating layer may be the outermost layer. In this case, the second porous coating layer is preferred when it is applied from slurry using an organic solvent. This is because when using an organic solvent, the binder polymer is distributed on the surface of the second porous coating layer in a larger amount as compared to the amount of the binder polymer distributed inside of the porous coating layer, as a result of phase separation, thereby providing increased adhesion between the separator and the electrode.

According to the present disclosure, the porous polymer substrate is a porous membrane, and can provide channels through which lithium ions are transported, while electrically insulating an anode and a cathode from each other to prevent a short-circuit. Any porous polymer substrate may be used with no particularly limitation, as long as it is conventionally used as a material for a separator in an electrochemical device.

The porous polymer substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film substrate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins In addition, there is no particular limitation in the thickness of the porous substrate, the porous substrate has a thickness of 1-100 μm, particularly 5-50 μm. Recently, as batteries have been provided with high output/high capacity, it is advantageous that a thin film is used as a porous polymer substrate. The pores present in the porous polymer substrate may have a diameter of 10-100 nm, 10-70 nm, 10-50 nm, or 10-35 nm, and a porosity of 5-90%, preferably 20-80%. However, such numerical ranges may be varied if necessary or according to a particular embodiment.

The pores of the porous polymer substrate may have various types of pore structures. Any pore structure is included in the scope of the present disclosure, as long as any one average pore size selected from average pore size determined by using a porosimeter or average pore size observed through field emission scanning electron microscopy (FE-SEM) satisfies the above-defined range.

Herein, in the case of a uniaxially oriented dry separator generally known to those skilled in the art, the average pore size may be based on the central pore size in the pore size along the transverse direction (TD), not the pore size along the machine direction (MD). In a variant, in the case of a porous polymer substrate (e.g. wet polyethylene (PE) separator) having a network structure, the average pore size may be based on the pore size determined by using a porosimeter.

The separator according to an embodiment of the present disclosure may be obtained by the method generally known to those skilled in the art. According to an embodiment of the present disclosure, prepared are slurry for forming a first porous coating layer including the first inorganic particles dispersed in a binder polymer solution containing the first binder polymer dissolved or dispersed in a solvent, and slurry for forming a second porous coating layer including the second inorganic particles dispersed in a binder polymer solution containing the second binder polymer dissolved or dispersed in a solvent.

Next, the slurry for forming a first porous coating layer is applied to the porous polymer substrate, followed by drying, to form the first porous coating layer.

Then, the slurry for forming a second porous coating layer is applied to the surface of the first porous coating layer, followed by drying, to form the second porous coating layer.

After that, an adhesive layer may be further formed on the second porous coating layer.

Although there is no particular limitation in the process for coating the slurry for forming a first porous coating layer and the slurry for forming a second porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the slurry for forming a first porous coating layer and the slurry for forming a second porous coating layer is dried by using a dryer, such as an oven, thereby forming porous coating layers on at least one surface of the porous substrate.

In the first and the second porous coating layers, the inorganic particles are bound among themselves by the binder polymers while they are packed and are in contact with each other. Thus, interstitial volumes are formed among the inorganic particles and the interstitial volumes become vacant spaces to form pores.

In other words, the binder polymers attach the inorganic particles to one another so that they may retain their binding states. For example, the binder polymers connect and fix the inorganic particles with one another. In addition, the pores of the porous coating layer are those formed by the interstitial volumes among the inorganic particles which become vacant spaces. The space may be defined by the inorganic particles facing one another substantially in a closely packed or densely packed structure of the inorganic particles.

In still another aspect of the present disclosure, there is provided an electrochemical device including a cathode, an anode and a separator interposed between the cathode and the anode, wherein the separator is the above-described separator.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

Artificial graphite, carbon black, carboxymethyl cellulose (CMC) and styrene butadiene rubber (SBR) were introduced to water at a weight ratio of 96:1:2:2 and mixed therein to prepare anode slurry. The anode slurry was coated onto copper (Cu) foil having a thickness of 50 μm as an anode current collector at a capacity of 3.55 mAh/g to form a thin electrode plate, which, in turn, was dried at 135° C. for 3 hours or more and then pressed to obtain an anode.

2) Manufacture of Cathode $LiNi_{0.6}Co_{0.2}Mn_{0.2}O_2$ as a cathode active material, carbon black and polyvinylidene fluoride (PVdF) were introduced to N-methyl-2-pyrrolidone at a weight ratio of 96:2:2 and mixed therein to prepare cathode slurry. The cathode slurry was coated on aluminum foil having a thickness of 20 μm as a cathode current collector at a capacity of 3.28 mAh/cm² to obtain a cathode.

3) Manufacture of Separator 3-1) Formation of First Porous Coating Layer

First, 105 g of carboxymethyl cellulose (CMC) was dissolved in water as a solvent at room temperature, and then 4500 g of the first inorganic particles ($Al(OH)_3$, 700 nm, Mohs hardness: 2.5) were introduced thereto and crushed and pulverized by using a ball mill for 3 hours. Next, 700 g of a first binder polymer, i.e. acrylic binder [polyethylhexyl acrylate-co-methyl methacrylate (Tg −5° C., average particle diameter: 300 nm)] was introduced to the resultant product and agitated for 1 hour to prepare slurry for forming a first porous coating layer. Herein, the weight ratio of the first inorganic particles:the first binder polymer was controlled to 86.5:13.5.

The slurry for forming a first porous coating layer was applied to both surfaces of a polyethylene porous film (thickness 9 μm, porosity 45%) through a dip coating process and dried at 80° C. to form the first porous coating layer having a thickness of 2 μm on each surface of the polyethylene porous film.

3-2) Formation of Second Porous Coating Layer

First, 105 g of carboxymethyl cellulose (CMC) was dissolved in water as a solvent at room temperature, and then 4500 g of the second inorganic particles ($Al_2O_3$, 500 nm, Mohs hardness: 9) were introduced thereto and crushed and pulverized by using a ball mill for 3 hours. Next, 700 g of a second binder polymer, i.e. acrylic binder [polyethylhexyl acrylate-co-methyl methacrylate (Tg −5° C., average particle diameter: 300 nm)] was introduced to the resultant product and agitated for 1 hour to prepare slurry for forming a second porous coating layer. Herein, the weight ratio of the first inorganic particles:the first binder polymer was controlled to 86.5:13.5.

The slurry for forming a second porous coating layer was applied to the first porous coating layer through a dip coating process and dried at 80° C. to form the second porous coating layer having a thickness of 2 μm on each of the first porous coating layers formed on both surfaces of the polyethylene porous film in 3-1).

3-3) Formation of Adhesive Layer

At room temperature, an acrylic binder (polyethylhexyl acrylate-co-methyl methacrylate, Tg −5° C., average particle diameter: 300 nm, solid content 30%) was dispersed in water as a solvent to prepare slurry for forming an adhesive layer. The slurry for forming an adhesive layer was coated onto each of the second porous coating layers formed on the first porous coating layers through a dip coating process and dried at 80° C. to form an adhesive layer having a thickness of 1 μm on each of the second porous coating layers.

4) Adhesion Between Separator and Electrode

Then, the separator was stacked on an electrode in such a manner that the adhesive layer might face the cathode active material layer of the electrode obtained from 1), and pressing was carried out at 70° C. under 600 kgf for 1 second to obtain an electrode assembly including the cathode laminated with the separator.

Example 2

An electrode assembly was obtained in the same manner as Example 1, except that the first inorganic particles used in the first porous coating layer were zinc oxide (Mohs hardness: 4.5, average particle diameter: 500 nm), and the second inorganic particles used in the second porous coating layer were aluminum nitride (Mohs hardness: 7, average particle diameter: 800 nm).

Comparative Example 1

An electrode assembly was obtained in the same manner as Example 1, except that a single porous coating layer was formed as follows.

1) Formation of Porous Coating Layer

Particularly, 105 g of carboxymethyl cellulose (CMC) was dissolved in water as a solvent at room temperature, and then 4500 g of the inorganic particles ($Al_2O_3$, 500 nm, Mohs hardness: 9) were introduced thereto and crushed and pulverized by using a ball mill for 3 hours. Next, 700 g of a binder polymer, i.e. acrylic binder [polyethylhexyl acrylate-co-methyl methacrylate (Tg −5° C., average particle diameter: 300 nm)] was introduced to the resultant product and agitated for 1 hour to prepare slurry for forming a porous coating layer. Herein, the weight ratio of the inorganic particles:the binder polymer was controlled to 86.5:13.5.

The slurry for forming a porous coating layer was applied to both surfaces of a polyethylene porous film (thickness 9 μm, porosity 45%) through a dip coating process and dried at 80° C. to form a porous coating layer having a thickness of 4 μm on each surface of the polyethylene porous film.

2) Formation of Adhesive Layer

An adhesive layer was formed on each surface of the porous coating layer in the same manner as 3-3) in Example 1.

Comparative Example 2

An electrode assembly was obtained in the same manner as Example 1, except that a single porous coating layer was formed as follows.

1) Formation of Porous Coating Layer Particularly, 105 g of carboxymethyl cellulose (CMC) was dissolved in water as a solvent at room temperature, and then 4500 g of the inorganic particles ($Al(OH)_3$, 700 nm, Mohs hardness: 2.5) were introduced thereto and crushed and pulverized by using a ball mill for 3 hours. Next, 700 g of a binder polymer, i.e. acrylic binder [poly ethylhexyl acrylate-co-methyl methacrylate (Tg −5° C., average particle diameter: 300 nm)] was introduced to the resultant product and agitated for 1 hour to prepare slurry for forming a porous coating layer. Herein, the weight ratio of the inorganic particles:the binder polymer was controlled to 86.5:13.5.

The slurry for forming a porous coating layer was applied to both surfaces of a polyethylene porous film (thickness 9 μm, porosity 45%) through a dip coating process and dried at 80° C. to form a porous coating layer having a thickness of 4 μm on each surface of the polyethylene porous film.

2) Formation of Adhesive Layer

An adhesive layer was formed on each surface of the porous coating layer in the same manner as 3-3) in Example 1.

Comparative Examples 3-6

Electrode assemblies were obtained in the same manner as Example 1, except that the first inorganic particles used in the first porous coating layer and the second inorganic particles used in the second porous coating layer were controlled as described in Table 1.

Test Results

Each of Examples 1 and 2 and Comparative Examples 1-6 was evaluated for thickness, particle diameter, dielectric breakdown voltage and hardness. The results are shown in Table 1.

Particularly, each test was carried out as follows.

1) Method for Determining Particle Diameter

The particle diameter of inorganic particles was determined by using a laser diffraction method (Microtrac MT 3000).

2) Method for Determining Dielectric Breakdown Voltage (Under Pressurization)

Each of the separators according to Examples 1 and 2 and Comparative Examples 1-6 was laminated with the cathode, and the resultant product was hot pressed by using a flat press equipped with a heater at a temperature of 70° C. under a pressure of 4 MPa for 1 second.

Figure 3:
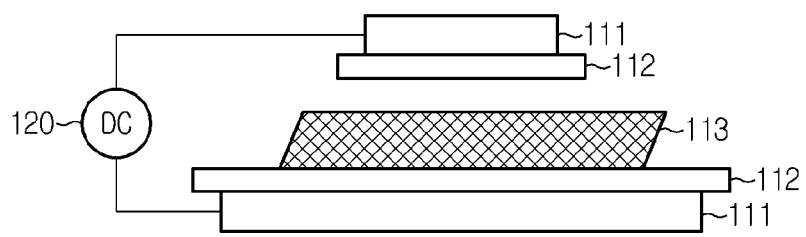
FIG. 3 is a schematic view illustrating a dielectric breakdown voltage tester.

Then, the hot pressed separator was mounted between a pair of jigs facing each other. When the separator was mounted to the jigs, a pressure of 10 KPa was applied to the hot pressed separator to be tested. Particularly, the separator 113 was interposed between aluminum jigs 111 bound with aluminum foil 112, as shown in FIG. 3.

After that, direct current voltage 120 applied from the voltage application unit connected directly to the jigs facing each other was increased gradually with time at a rate of 100V/sec from 0V to 5,000V. Herein, the voltage measured when the current value measured at the current measuring unit connected directly to the jigs was maintained at 0.5 mA or more for 3 seconds was determined as dielectric breakdown voltage.

3) Method for Determining Dielectric Breakdown Voltage (No Pressurization)

Each of the separators according to Examples 1 and 2 and Comparative Examples 1-6 was laminated with the cathode, and the resultant product was mounted between a pair of jigs facing each other.

Then, direct current voltage applied from the voltage application unit connected directly to the jigs facing each other was increased gradually with time at a rate of 100V/sec from 0V to 5,000V. Herein, the voltage measured when the current value measured at the current measuring unit connected directly to the jigs was maintained at 0.5 mA or more for 3 seconds was determined as dielectric breakdown voltage.

4) Method for Determining Hardness of Porous Coating Layer

Hardness was determined according to the standard of ASTM D3363.

Particularly, a sample coated with a porous coating layer and having a size of 50 mm×50 mm was fixed to a PET film having a thickness of 100 µm by using a double-sided tape. Then, the surface of the fixed porous coating layer was scratched by using a pencil hardness tester at a level of (6B-3B<2B<B<HB<F<H<2H<3H-6H). After that, it was checked whether scratch marks were present on the sample surface or not, and hardness was compared with pencil hardness.

The test was carried out 10 times in the above-described manner. The results are shown in Table 1 as average values.

5) Method for Measuring Thickness

The thickness of each separator was measured by using a thickness tester (Mitutoyo Co., VL-50S-B).

TABLE 1

| | | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| First inorganic particles | | Aluminum hydroxide (Mohs hardness: 2.5) Average particle diameter: 700 nm | Zinc oxide (Mohs hardness: 4.5) Average particle diameter: 500 nm | Alumina (Mohs hardness: 9) Average particle diameter: 500 nm | Aluminum hydroxide (Mohs hardness: 2.5) Average particle diameter: 700 nm | Alumina (Mohs hardness: 9) Average particle diameter: 500 nm | Silicon dioxide (Mohs hardness: 6) Average particle diameter: 500 nm | Aluminum hydroxide (Mohs hardness: 2.5) Average particle diameter: 700 nm | Zinc oxide (Mohs hardness: 4.5) Average particle diameter: 500 nm |
| Second inorganic particles | | Alumina (Mohs hardness: 9) Average particle diameter: 500 nm | Aluminum nitride (Mohs hardness: 7) Average particle diameter: 800 nm | | | Aluminum hydroxide (Mohs hardness: 2.5) Average particle diameter: 700 nm | Alumina (Mohs hardness: 9) Average particle diameter: 500 nm | Zinc oxide (Mohs hardness: 4.5) Average particle diameter: 500 nm | Silicon dioxide (Mohs hardness: 6.5) Average particle diameter: 500 nm |
| Total thickness of separator (µm) | | 19 | 19 | 19 | 19 | 19 | 19 | 19 | 19 |
| Dielectric breakdown voltage (kV) | No pressurization (A) | 2.3295 | 2.4498 | 2.4541 | 2.3436 | 2.3268 | 2.37841 | 2.3435 | 2.3623 |
| | Under pressurization (B) | 1.8612 | 1.7123 | 1.4357 | 1.9057 | 1.4437 | 1.5371 | 1.8842 | 1.6578 |
| Decrease in dielectric breakdown voltage depending on pressurization (%) (A − B)/A × 100 | | 20.10% | 30.10% | 41.50% | 18.68% | 37.95% | 35.37% | 19.60% | 29.82% |
| Difference in hardness between first inorganic particles and second inorganic particles | | 6.5 | 2.5 | — | — | 6.5 | 3 | 2 | 2 |
| Hardness of porous coating layer | | HB | HB | H | 4B | 4B | HB | 2B | 2B |

As can be seen from Table 1, in the case of Example 1, the difference in Mohs hardness between the first inorganic particles and the second inorganic particles is 6.5. The hardness of the porous coating layer measured in this case is high, i.e. HB, and thus it is possible to prevent the separator from being damaged by external foreign materials. In addition, since the first inorganic particles contained in the first porous coating layer that is in direct contact with the porous polymer substrate have low hardness, it is possible to minimize a decrease in dielectric breakdown voltage depending on pressurization.

On the contrary, in the case of Comparative Example 1 or 2 using a single porous coating layer alone, a significant decrease in dielectric breakdown voltage (Comparative Example 1) is observed depending on the Mohs hardness of the inorganic particles, or it is difficult to minimize damages upon the separator caused by external foreign materials (Comparative Example 2) due to the low hardness of the porous coating layer.

Meanwhile, in the case of Comparative Example 3 using the first inorganic particles having a higher hardness and the second inorganic particles having a lower hardness, the porous coating layer has a low hardness and a significant decrease in dielectric breakdown voltage is observed. Thus, it is not possible to obtain desired effects of the present disclosure.

In the case of Comparative Example 4 using the first inorganic particles, not having a hardness of 4.5 or less, a significant decrease in dielectric breakdown voltage is observed depending on pressurization. Thus, it is difficult to improve the safety of a battery.

In the case of Comparative Example 5 using the second inorganic particles, not having a hardness of 7 or more, it is difficult to prevent the separator from being damaged by external foreign materials due to the low hardness of the porous coating layer.

In the case of Comparative Example 6 wherein the difference in Mohs hardness between the first inorganic particles and the second inorganic particles is not significant, it is not possible to obtain desired effects of the present disclosure.

What is claimed is:

1. A separator for an electrochemical device which comprises:
   a porous polymer substrate having a plurality of pores;
   a first porous coating layer formed on at least one surface of the porous polymer substrate, the first porous coating layer comprising first inorganic particles and a first binder polymer positioned on a whole or a part of a surface of the first inorganic particles to connect and fix the first inorganic particles with one another;
   a second porous coating layer formed on at least one surface of the first porous coating layer opposite the porous polymer substrate, the second porous coating layer comprising second inorganic particles and a second binder polymer positioned on a whole or a part of a surface of the second inorganic particles to connect and fix the second inorganic particles with one another,
   wherein the first inorganic particles and the second inorganic particles each independently comprise an inorganic material selected from the group consisting of boehmite, zinc oxide, magnesium oxide, magnesium hydroxide, aluminum hydroxide, alumina, and aluminum nitride,
   wherein the first inorganic particles have a Mohs hardness of 4.5 or less and the second inorganic particles have a Mohs hardness of 7 or more, and a difference in Mohs hardness between the first inorganic particles and the second inorganic particles is 2.5 to 6.5; and
   an adhesive layer formed on at least one surface of the second porous coating layer,
   wherein the adhesive layer comprises adhesive resin particles, and
   wherein the adhesive resin particles comprise at least one selected from styrene butadiene rubber, acrylonitrile-butadiene rubber, acrylonitrile-butadiene-styrene rubber, polyethylhexyl acrylate-co-methyl methacrylate, polybutylacrylate-co-methyl methacrylate, polyacrylonitrile, polyvinyl chloride, polyvinyl alcohol, styrene or polycyanoacrylate.

2. The separator for an electrochemical device according to claim 1, wherein the first inorganic particles comprise at least one of boehmite, zinc oxide, magnesium oxide, magnesium hydroxide, or aluminum hydroxide.

3. The separator for an electrochemical device according to claim 1, wherein the second inorganic particles comprise at least one of alumina, or aluminum nitride.

4. The separator for an electrochemical device according to claim 1, wherein the first inorganic particles have an average particle diameter of 50 nm to 3000 nm.

5. The separator for an electrochemical device according to claim 1, wherein the second inorganic particles have an average diameter of 50 nm to 3000 nm.

6. The separator for an electrochemical device according to claim 1, wherein a weight ratio of the first inorganic particles:the first binder polymer is 20:80 to 95:5.

7. The separator for an electrochemical device according to claim 1, wherein a weight ratio of the second inorganic particles:the second binder polymer is 20:80 to 95:5.

8. The separator for an electrochemical device according to claim 1, wherein the first porous coating layer has a thickness of 1 μm to 20 μm, and the second porous coating layer has a thickness of 1 μm to 20 μm.

9. The separator for an electrochemical device according to claim 1, wherein each of the first binder polymer and the second binder polymer independently comprise at least one of polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylhexyl acrylate-co-methyl methacrylate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, or carboxymethyl cellulose.

10. The separator for an electrochemical device according to claim 1, wherein the second porous coating layer is an outermost layer of the separator.

11. An electrochemical device comprising
    a cathode;
    an anode; and
    a separator interposed between the cathode and the anode, wherein the separator is the separator according to claim 1.

12. The electrochemical device according to claim 11, wherein the electrochemical device is a lithium secondary battery.

* * * * *